United States Patent
Jaradi et al.

(10) Patent No.: US 10,501,038 B2
(45) Date of Patent: Dec. 10, 2019

(54) GUIDE FOR SEATBELT WEBBING THAT MOVES AUTOMATICALLY IN RESPONSE TO AN OBLIQUE OR FAR-SIDE IMPACT EVENT TO MAINTAIN OCCUPANT IN PROPER ORIENTATION

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 210 days.

(21) Appl. No.: 15/784,762

(22) Filed: Oct. 16, 2017

(65) Prior Publication Data
US 2019/0111875 A1    Apr. 18, 2019

(51) Int. Cl.
| | |
|---|---|
| *B60N 2/68* | (2006.01) |
| *B60R 21/0136* | (2006.01) |
| *B60N 2/42* | (2006.01) |
| *B60R 22/18* | (2006.01) |
| *B60R 21/00* | (2006.01) |
| *B60R 21/01* | (2006.01) |

(52) U.S. Cl.
CPC ........ *B60R 21/0136* (2013.01); *B60N 2/4207* (2013.01); *B60N 2/4235* (2013.01); *B60N 2/688* (2013.01); *B60R 2021/0006* (2013.01); *B60R 2021/0009* (2013.01); *B60R 2021/01034* (2013.01); *B60R 2021/01286* (2013.01); *B60R 2022/1818* (2013.01)

(58) Field of Classification Search
CPC ........ B60R 21/0136; B60R 2021/0009; B60N 2/688
See application file for complete search history.

(56) References Cited

U.S. PATENT DOCUMENTS

| | | | |
|---|---|---|---|
| 5,294,150 A | | 3/1994 | Steffens, Jr. |
| 6,145,881 A | * | 11/2000 | Miller, III ........... B60R 22/1951 280/801.2 |

(Continued)

FOREIGN PATENT DOCUMENTS

| | | |
|---|---|---|
| EP | 1593559 A1 | 11/2005 |
| EP | 2143596 A1 | 1/2010 |

*Primary Examiner* — James A English
(74) *Attorney, Agent, or Firm* — Vichit Chea; Price Heneveld LLP

(57) ABSTRACT

A seatback for a seating assembly in a vehicle comprises: a vertical midline; and a guide for seatbelt webbing having a first position and a second position; wherein, the second position is closer to the vertical midline than the first position. The seatback further includes a frame and trim at least partially covering the frame. The guide can be operably coupled to the frame. The guide can be disposed at least partially above the trim. The seatback can further include an actuator with a piston to move the guide. The piston can be operably connected to the guide below the trim having a first position and a second position. When the piston is in the first position, the guide is in the first position. When the piston is in the second position, the guide is in the second position. The actuator can be a controller controlled pyrotechnic actuator.

20 Claims, 12 Drawing Sheets

(56) References Cited

U.S. PATENT DOCUMENTS

| | | | | |
|---|---|---|---|---|
| 6,293,588 | B1* | 9/2001 | Clune | B60R 21/02 |
| | | | | 180/268 |
| 6,811,186 | B1* | 11/2004 | Fraley | B60N 2/688 |
| | | | | 280/801.2 |
| 7,296,504 | B2 | 11/2007 | Borg et al. | |
| 2002/0089164 | A1 | 7/2002 | Rouhana et al. | |
| 2006/0289220 | A1* | 12/2006 | Oota | B60R 21/02 |
| | | | | 180/274 |
| 2009/0079242 | A1* | 3/2009 | Erlingstam | B60N 2/3084 |
| | | | | 297/237 |
| 2011/0022275 | A1* | 1/2011 | Oosaki | B60R 21/0136 |
| | | | | 701/45 |
| 2012/0217733 | A1* | 8/2012 | Adolfsson | B60R 22/18 |
| | | | | 280/806 |
| 2012/0217787 | A1* | 8/2012 | Adolfsson | B60R 22/18 |
| | | | | 297/480 |
| 2017/0120860 | A1* | 5/2017 | Shenaq | B60N 2/688 |
| 2019/0077365 | A1* | 3/2019 | Faruque | B60R 22/20 |

* cited by examiner

GUIDE FOR SEATBELT WEBBING THAT MOVES AUTOMATICALLY IN RESPONSE TO AN OBLIQUE OR FAR-SIDE IMPACT EVENT TO MAINTAIN OCCUPANT IN PROPER ORIENTATION

FIELD OF THE INVENTION

The present invention generally relates to a seating assembly for a vehicle and more particularly to a guide for seatbelt webbing that moves from a first position to a second position, to maintain an occupant of the seating assembly in a proper orientation, during an oblique or far-side impact event.

BACKGROUND OF THE INVENTION

A vehicle typically includes one or more seating assemblies to support an occupant during use of the vehicle. Each seating assembly typically has a seatbelt webbing configured to maintain the occupant on the seating assembly during an impact event. Some vehicles include one or more airbags as well to protect the occupant during an impact event.

SUMMARY OF THE INVENTION

According to a first aspect of the present invention, a seatback for a seating assembly in a vehicle comprises: a vertical midline; and a guide for seatbelt webbing having a first position and a second position; wherein, the second position is closer to the vertical midline than the first position.

Embodiments of the first aspect of the invention can include any one or a combination of the following features:
- a frame and trim at least partially covering the frame, wherein, the guide is operably coupled to the frame, and wherein, the guide is disposed at least partially above the trim;
- an actuator with a piston, the piston operably connected to the guide below the trim having a first position and a second position, wherein, when the piston is in the first position, the guide is in the first position, and wherein, when the piston is in the second position, the guide is in the second position;
- a track attached to the frame, and a connector, slidably supported by the track, operably connecting the piston to the web guide;
- a bracket attaching the actuator to the frame, wherein, the connector is disposed between the actuator and the frame;
- the actuator is a pyrotechnic actuator;
- the track is disposed between the actuator and the guide;
- a top portion, wherein, the connector is disposed adjacent the top portion of the seatback;
- the first position of the guide is at least one inch away from the second position of the guide;
- the pyrotechnic actuator includes a non-return mechanism;
- the pyrotechnic actuator is configured to cause the piston to move from the first position to the second position in response to the vehicle encountering an oblique impact event or a far-side impact event; and
- the non-return mechanism prevents the piston from returning to the first position from the second position.

According to a second aspect of the present invention, a method of maintaining proper orientation of an occupant in a seating assembly of a vehicle while the vehicle is engaged in an oblique impact event or a far-side impact event comprises: presenting a seating assembly of a vehicle with a seatback, the seatback comprising a vertical midline and a guide for a seatbelt webbing having a first position relative to the vertical midline; determining that the vehicle is engaged in an oblique impact event or a far-side impact event; and moving the guide to a second position, which is closer to the vertical midline than the first position, in response to the oblique impact event or the far-side impact event.

Embodiments of the second aspect of the invention can include any one or a combination of the following features:
- at the second position, a portion of the guide disposed above the trim is closer to the vertical midline than at the first position, and a portion of the guide disposed below the trim is closer to the vertical midline than at the first position;
- moving the guide to the second position in response to the oblique impact event or the far-side impact event includes the actuator moving the piston from the first position to the second position, in response to the oblique impact event or the far-side impact event, which in turn causes the guide to move from the first position to the second position;
- moving the guide to the second position in response to the oblique impact event or far-side impact event includes the connector sliding along the track;
- moving the guide to a second position in response to the oblique impact event includes the pyrotechnic actuator firing in response to the oblique impact event and causing the guide to move to the second position;
- determining that the vehicle is engaged in an oblique impact event or far-side impact event includes one or more sensors providing data to a controller that determines, based on the data, that the vehicle is engaged in an oblique impact event;
- moving the guide to a second position in response to the oblique impact event includes the controller causing the pyrotechnic actuator to fire;
- the one or more sensors include inertial sensors;
- the vehicle further including one or more airbags;
- the controller is a restraints control module that additionally controls whether one or more airbags deploy;
- causing one or more airbags to deploy in response to the oblique impact event or the far-side impact event; and
- preventing the piston from moving from the second position back toward the first position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
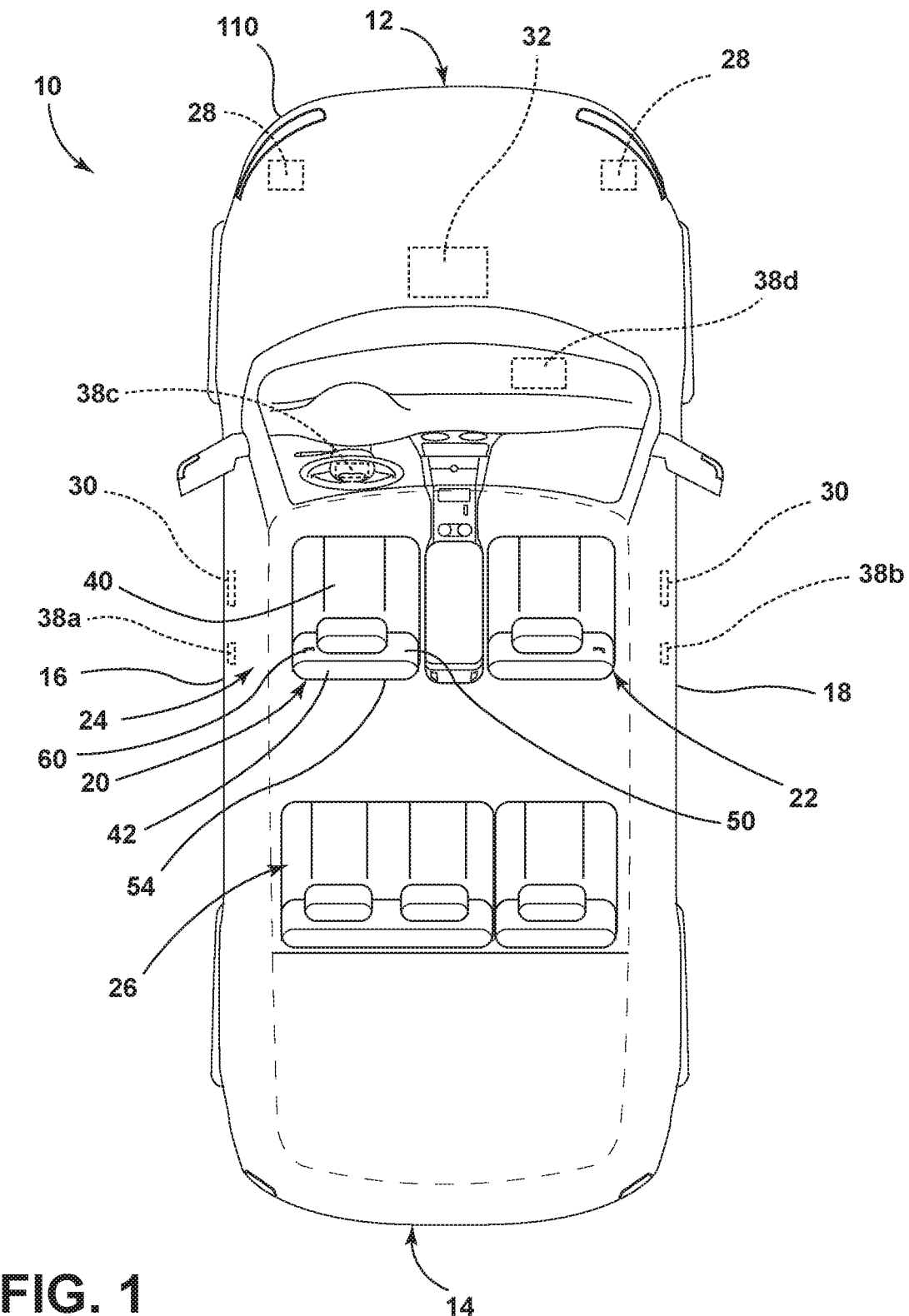
FIG. 1 is an overhead schematic view of a vehicle including a first seating assembly, a controller, several side impact sensors, several oblique impact sensors, and several airbags.
Figure 4:
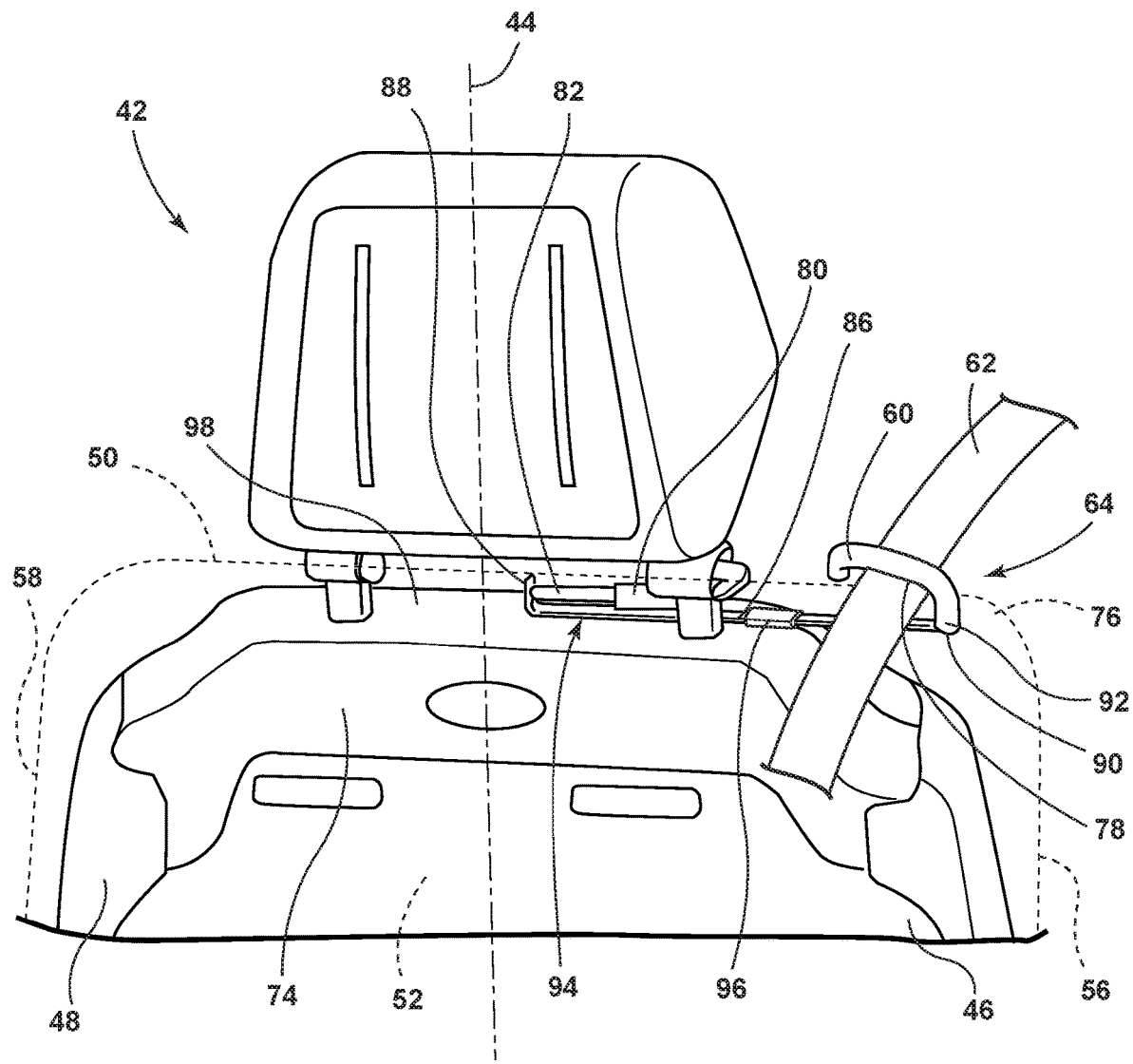
FIG. 4 is a front view of the seatback of FIG. 3, illustrating an actuator with a piston, in a first position, connected to a connector to move the guide, also in a first position, from beneath the trim, which is shown in phantom.

For purposes of description herein, the terms "forward," "above," "beneath," "over," "laterally," and derivatives thereof shall relate to the disclosure as oriented in FIGS. 1 and 4. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
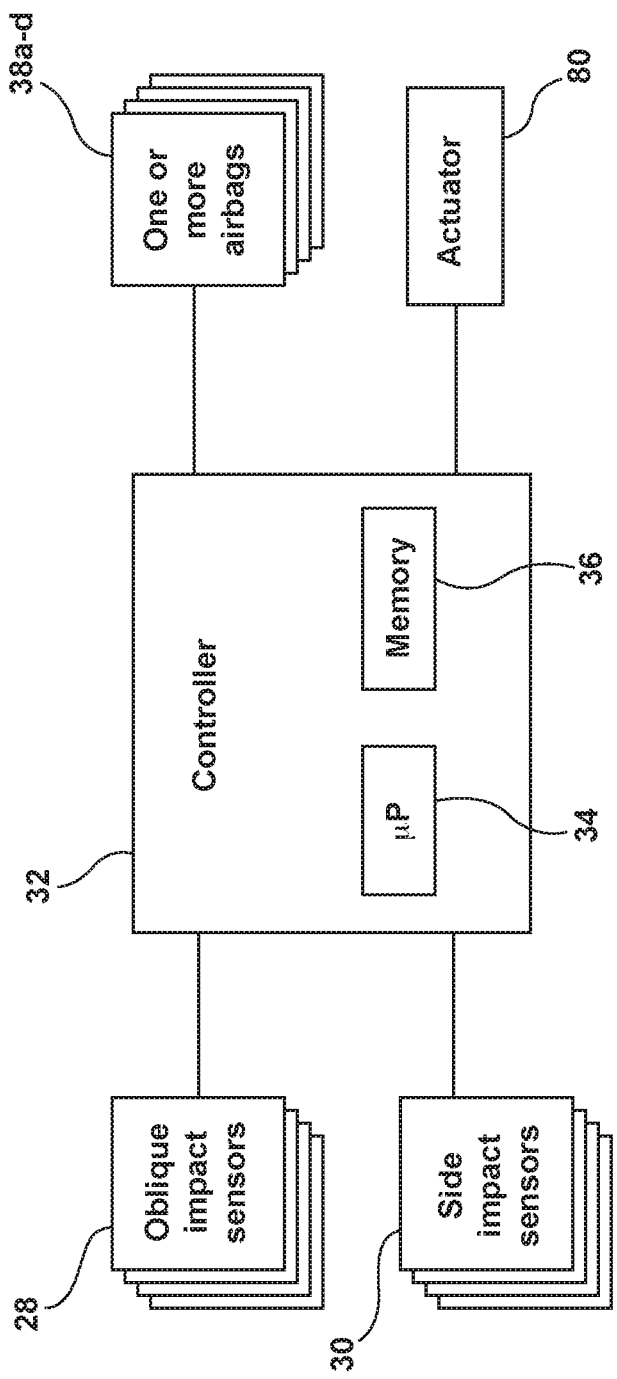
FIG. 2 is a diagram of the controller of the FIG. 1, illustrating the controller using the oblique impact sensors and side impact sensors as inputs and controlling an actuator and the several airbags.

Referring to FIGS. 1 and 2, a vehicle 10 includes a front 12, a rear 14 on the opposite side of the vehicle 10 as the front 12, a first side 16, and a second side 18 on the opposite side of the vehicle 10 as the first side 16. The vehicle 10 further includes a first seating assembly 20 and a second seating assembly 22, which form a first row of seating 24. The vehicle 10 may further include a second row of seating 26, a third row of seating (not illustrated) and so on. The vehicle 10 further includes one or more oblique impact sensors 28, one or more side impact sensors 30, and a controller 32. The one or more oblique impact sensors 28 and the one or more side impact sensors 30 can be inertial sensors. The one or more oblique impact sensors 28 and the one or more side impact sensors 30 communicate with the controller 32 (see FIG. 2), which includes a microprocessor 34 capable of executing various programs stored in memory 36.

The vehicle 10 further includes one or more airbags 38a-d, such as a first side airbag 38a between the first seating assembly 20 and the first side 16, a second side airbag 38b between the second seating assembly 22 and the second side 18, a first forward airbag 38c disposed forward of the first seating assembly 20, and a second forward airbag 38d disposed forward of the second seating assembly 22. The controller 32 is additionally in communication with the first side airbag 38a, the second side airbag 38b, the first forward airbag 38c, and the second forward airbag 38d. The controller 32 can take the data communicated to the controller 32 by the one or more oblique impact sensors 28 and the one or more side impact sensors 30 to determine, based on that data, whether to cause one or more of the first side airbag 38a, the second side airbag 38b, the first forward airbag 38c, and the second forward airbag 38d to deploy. In such a circumstance, the controller 32 may be referred to as a restraints control module.

Figure 3:
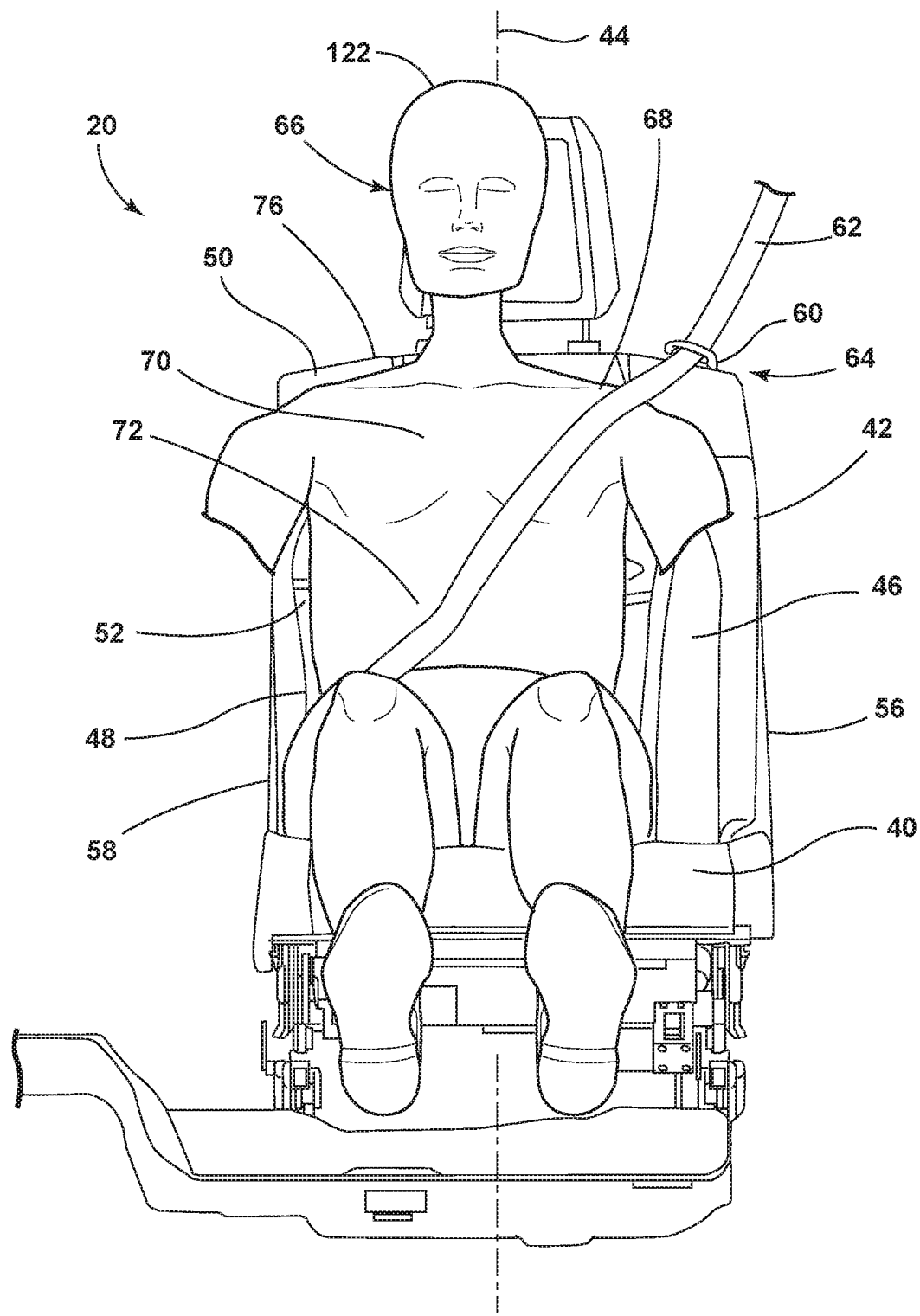
FIG. 3 is a front view of the first seating assembly of FIG. 1, illustrating a seatback having a vertical midline and a guide guiding seatbelt webbing over an occupant.
Figure 5:
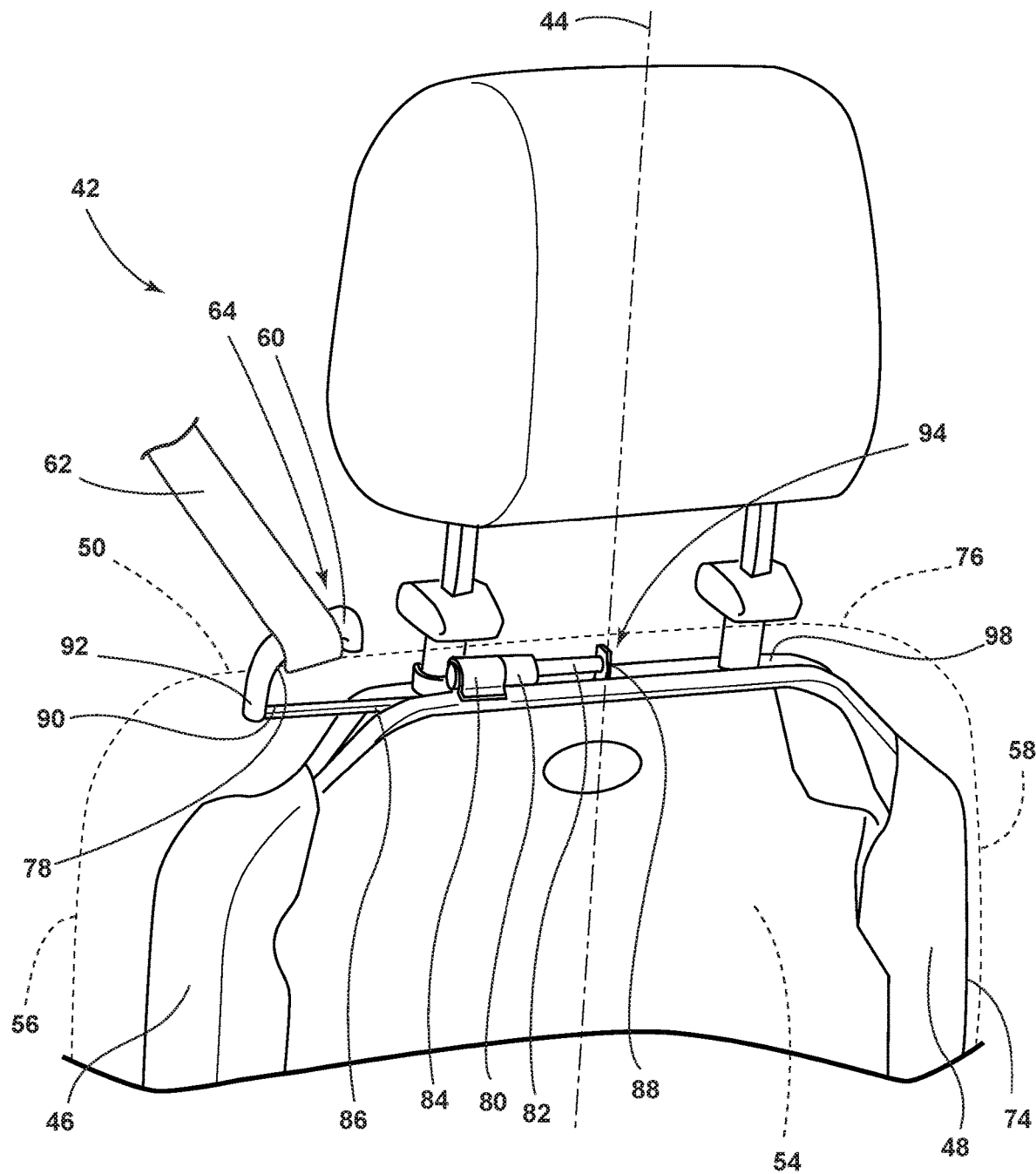
FIG. 5 is a rear view of the seatback of FIG. 3, illustrating a bracket attaching the actuator to a frame that provides structural support for the seatback.

Referring now to FIGS. 3-5, the first seating assembly 20 includes a seat 40 and a seatback 42, which is typically in pivotable relationship with the seat 40. The seatback 42 includes a vertical midline 44 roughly dividing the seatback 42 into one half 46 and another half 48. The seatback 42 also includes a top portion 50, a front 52, a back 54, and two side portions 56, 58. The side portion 56 is disposed at half 46 of the seatback 42, while side portion 58 is disposed at other half 48.

The seatback 42 further includes a guide 60 for guiding seatbelt webbing 62. The guide 60, in FIG. 3, is illustrated in a first position 64 relative to the vertical midline 44. The guide 60 is typically in the first position 64 when the vehicle 10 is not engaged in an impact event, such as an accident or crash with another vehicle. In general terms, the guide 60 guides the seatbelt webbing 62 over an occupant 66 of the first seating assembly 20, more specifically, across the shoulder area 68, chest area 70, and the stomach area 72 of the occupant 66.

The seatback 42 further includes a frame 74, which provides structural support for the seatback 42. The seatback 42 further includes trim 76 at least partially covering the frame 74. The trim 76 includes an outermost layer of fabric that contacts the occupant 66 of the seating assembly 20 and padding disposed under the fabric. The guide 60 is disposed at least partially above the trim 76. For example, the guide 60 includes a contact portion 78, which contacts the seatbelt webbing 62, and the contact portion 78 is disposed above the trim 76.

The seatback 42 further includes an actuator 80, such as a pyrotechnic actuator, in communication with the controller 32 (see FIG. 2). The actuator 80 includes a piston 82. The pyrotechnic actuator 80, fires upon command from the controller 32, pushing the piston 82. A bracket 84 attaches the actuator 80 to the frame 74. The piston 82 is attached to a connector 86, for example at a first end 88 of the connector 86. The connector 86 is additionally attached to the guide 60, for example at a second end 90 of the connector 86 and a connector end 92 of the guide 60. The connector 86 thus operably connects the piston 82 to the guide 60, such that, as the piston 82 is moved, the guide 60 moves as well. In other words, the piston 82 also has a first position 94 and is illustrated in FIGS. 4 and 5 in the first position 94. When the piston 82 is in the first position 94, the guide 60 is in the first position 64. In this embodiment, the connector 86 is disposed near the top portion 50 of the seatback 42. The guide 60, then, is thus operably coupled to the frame 74, through the connector 86, the piston 82, and then the actuator 80, which is attached to the frame 74 via the bracket 84. The operable connection between the piston 82 and the guide 60, i.e., the connector 86, is disposed below the trim 76.

The seatback 42 further includes a track 96 for the connector 86. The track 96 is attached to the frame 74, such as at a top 98 of the frame 74. The connector 86 is slidably supported by the track 96. In other words, the connector 86 can slide within the track 96, in the event the actuator 80 pushes the piston 82 attached to the connector 86. The connector 86 is disposed beneath the trim 76. In this embodiment, the connector 86 is disposed between the actuator 80 and the frame 74, specifically, the top 98 of the frame 74. The bracket 84 situates the actuator 80 over the connector 86. In this embodiment, the track 96 is disposed laterally between the actuator 80 and the guide 60.

Figure 6:
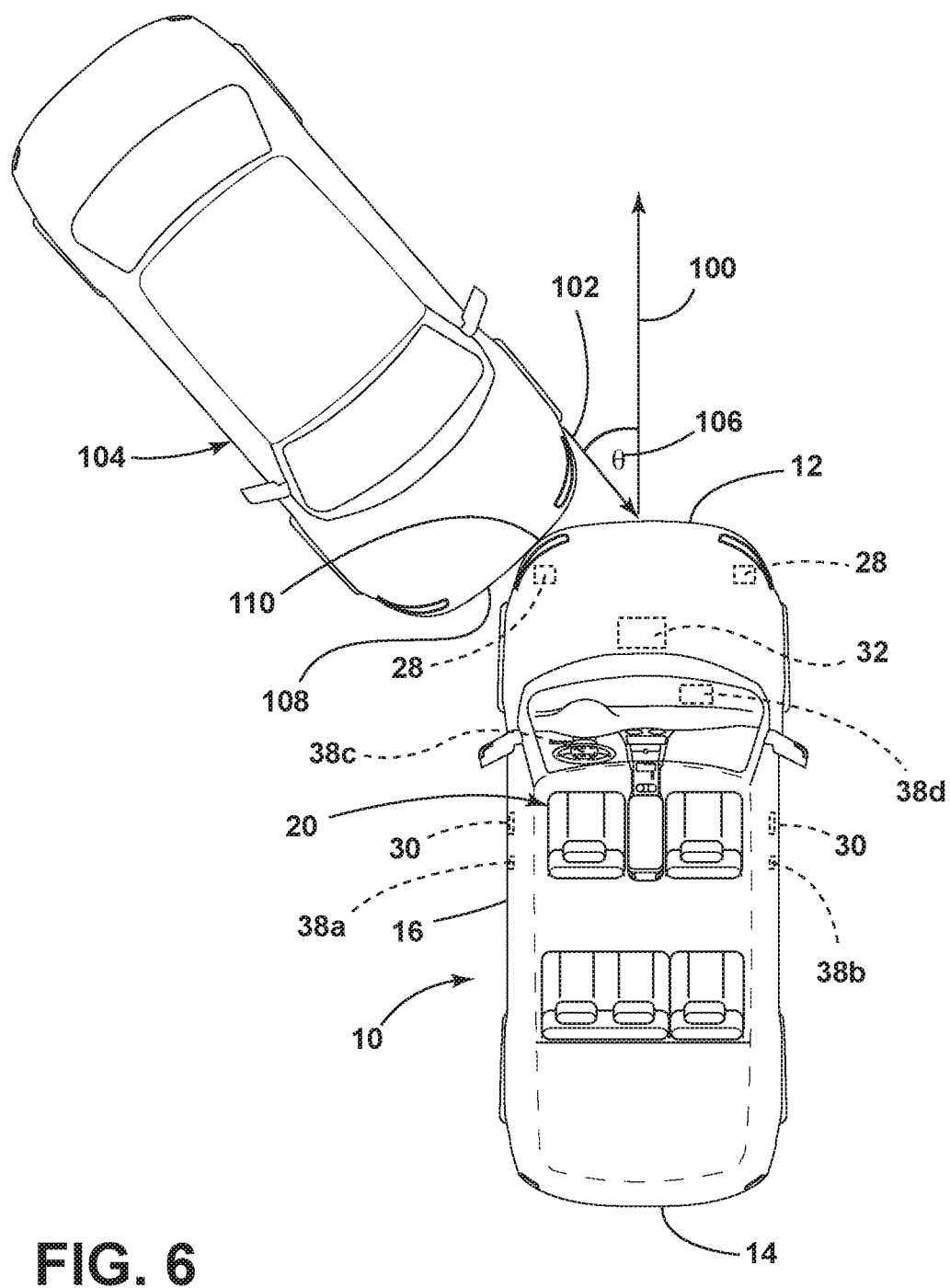
FIG. 6 is an overhead schematic view of another vehicle interacting with the vehicle of FIG. 1 in an oblique impact event, which can be sensed by the oblique impact sensors.

Referring now to FIG. 6, the vehicle 10 is illustrated engaged in an oblique impact event. An oblique impact event, without being bound by any specific definition, generally includes an impact where the path of travel 100 of the vehicle 10 and the path of travel 102 of another vehicle 104 form an angle 106 between 1 degree and 89 degrees. In the example illustrated, the angle is approximately 45 degrees. In general terms, an oblique impact event occurs when a front 108 of the other vehicle 104 hits a corner 110 of the vehicle 10, such as the corner 110 marking the transition between the first side 16 and the front 12 of the vehicle 10.

Figure 7:
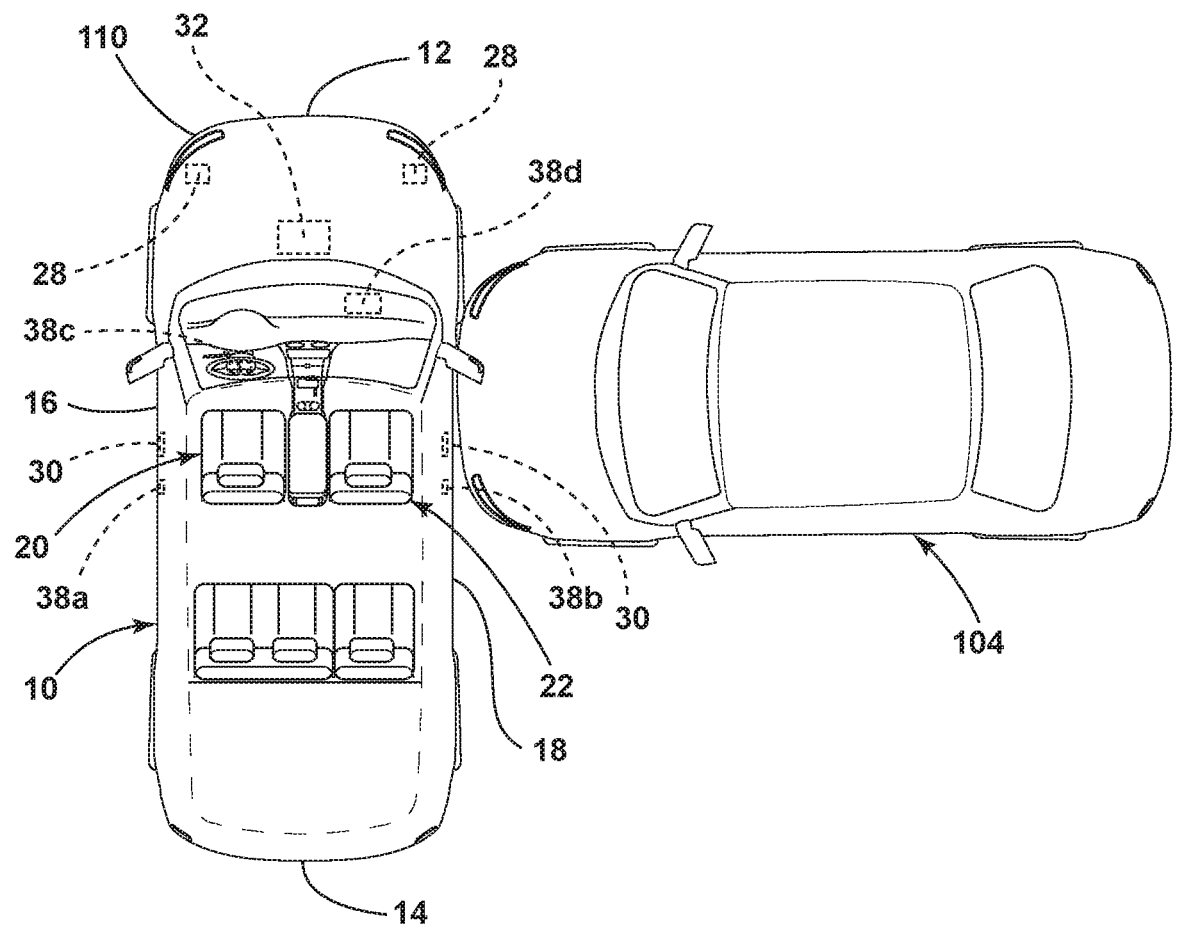
FIG. 7 is an overhead schematic view of the other view of FIG. 6 interacting with the vehicle of FIG. 1 in a far-side impact event, relative to the first seating assembly of FIG. 1, which can be sensed by one of the side impact sensors.

Referring now to FIG. 7, the vehicle 10 is illustrated engaged in a far-side impact event, relative to the first seating assembly 20. In other words, the far-side of the vehicle 10 relative to the first seating assembly 20 is second side 18, and the other vehicle 104 is crashing into the vehicle 10 at that second side 18. The far-side of the vehicle 10 relative to the second seating assembly 22 is first side 16, and the other vehicle 104 would be crashing into the vehicle 10 at that first side 16 for the event to be a far-side impact event relative to the second seating assembly 22.

In the event that the vehicle 10 engages in an oblique impact event (as in FIG. 6) or a far-side impact event (as in FIG. 7), the one or more oblique impact sensors 28 or the one or more side impact sensors 30, respectively, will sense the event and relay the appropriate data to the controller 32. The controller 32, in turn, determining that the vehicle 10 is engaged in an oblique impact event or far-side impact event, based on the data from the one or more oblique impact sensors 28 or the one or more side impact sensors 30, respectively, causes the actuator 80 to push the piston 82 from the first position 94.

Figure 8:
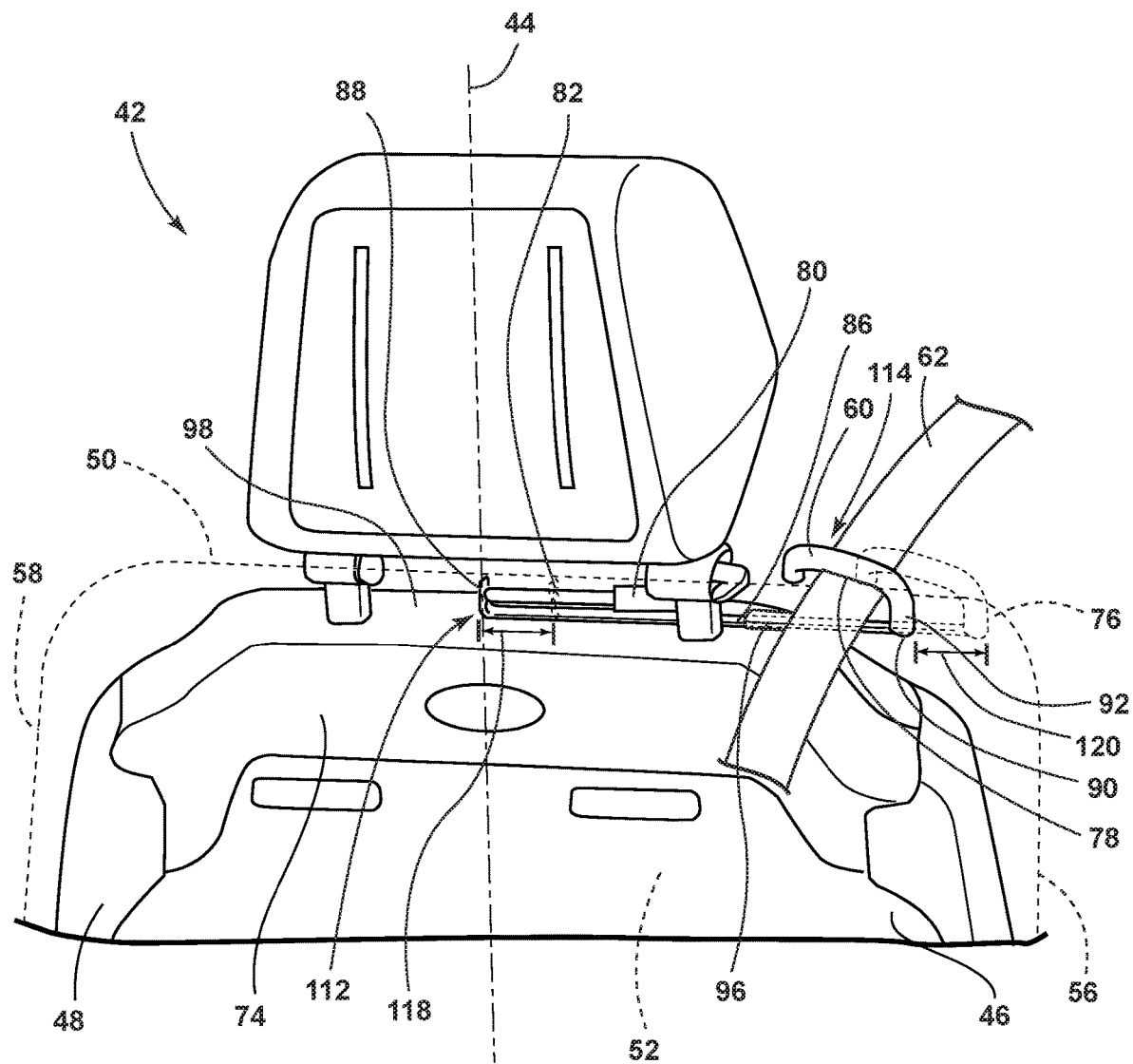
FIG. 8 is a front view of the seatback of FIG. 3, illustrating the actuator having moved the piston to a second position closer to the vertical midline and therefore the guide to a second position also closer to the vertical midline.
Figure 9:
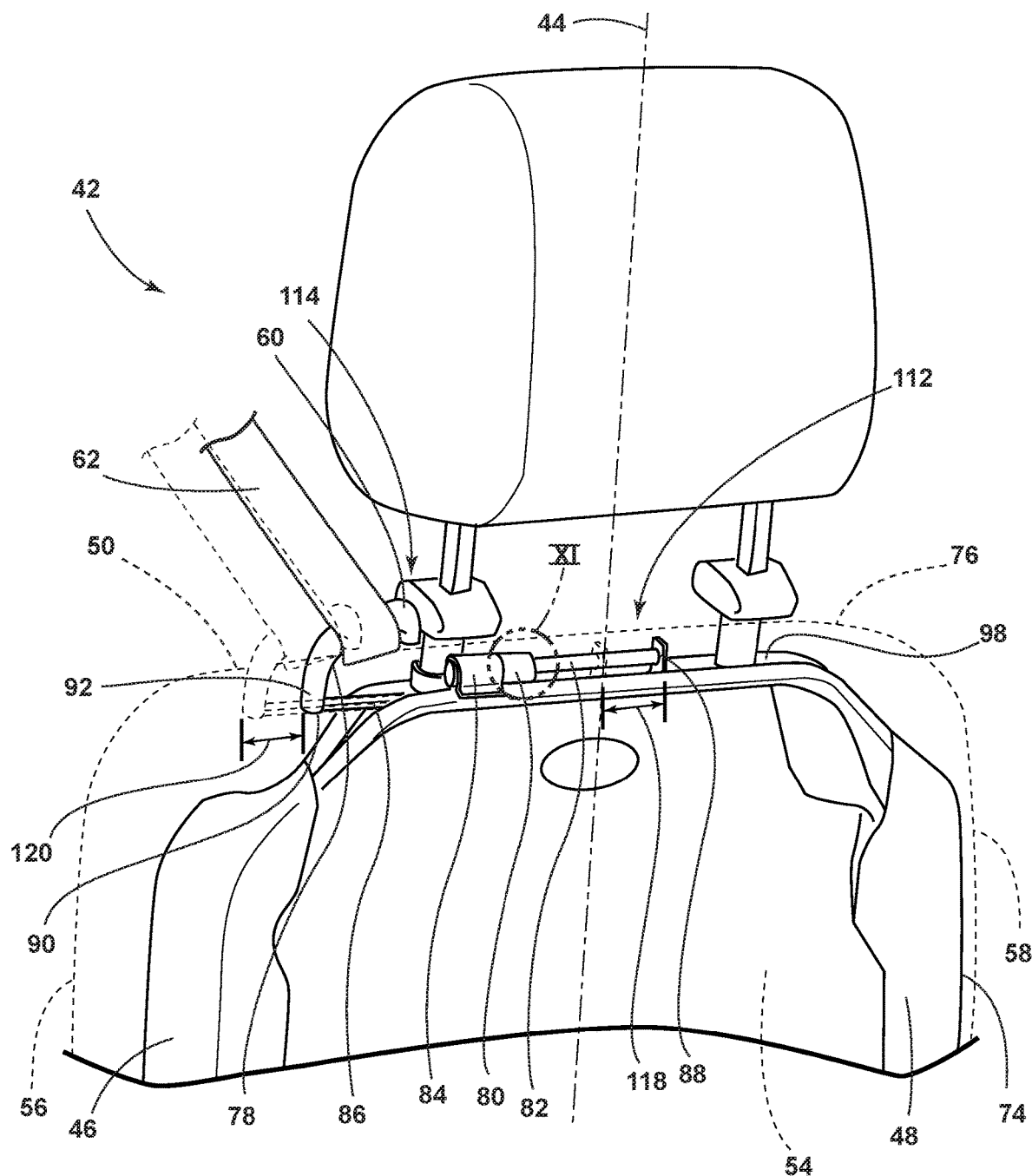
FIG. 9 is a rear view of the seatback of FIG. 3, illustrating the actuator having moved the piston to a second position closer to the vertical midline and therefore the guide to a second position also closer to the vertical midline.
Figure 10:
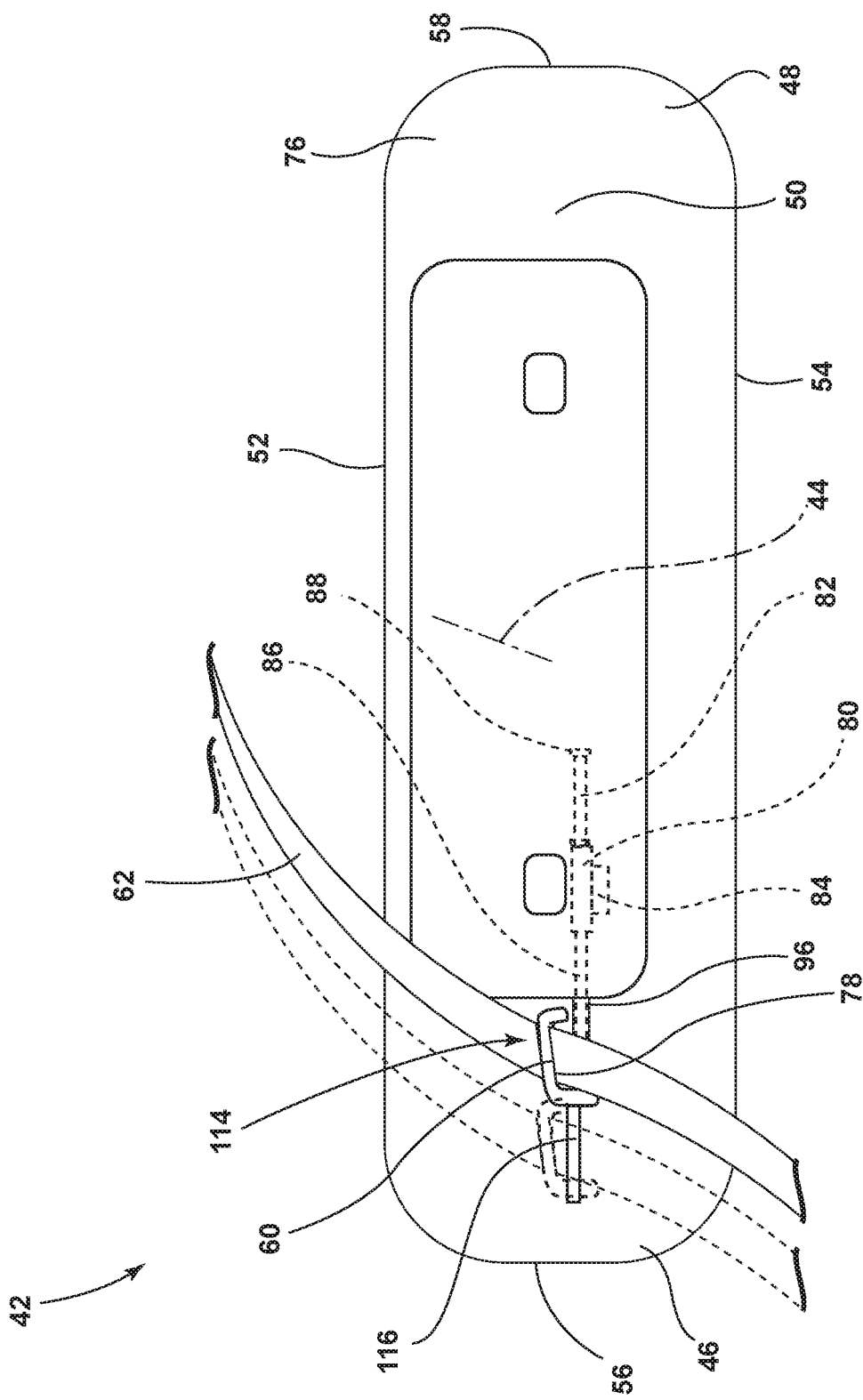
FIG. 10 is an overhead view of the seatback of FIG. 3, with the piston and the guide in their respective second positions and the guide moving to the second position through a slot in the trim.

Referring now to FIGS. 8-10, more specifically, the controller 32 causes the actuator 80 to cause the piston 82 to move, such as by pushing the piston 82, to a second position 112, which is closer to the vertical midline 44 of the seatback 42 than the first position 94, in response to the vehicle 10 encountering an oblique impact event or a far-side impact event. Because the guide 60 is operably connected to the piston 82, as discussed above, the movement of the piston 82 to the second position 112 additionally causes the guide 60 to move to a second position 114. Like the piston 82, the second position 114 of the guide 60 is closer to the vertical midline 44 of the seatback 42 than the first position 64. Thus, when the piston 82 is in the second position 112, the guide 60 is in the second position 114. A portion of the guide 60 disposed above the trim 76, such as the contact portion 78, is closer to the vertical midline 44 at the second position 114 than at the first position 64. A portion of the guide 60 disposed below the trim 76, such as the connector end 92, is closer to the vertical midline 44 than at the first position 64. The guide 60 moves to, from, and between the first position 64 and the second position 114, through a slot 116 in the trim 76 (see FIG. 10). Distance 118 represents the difference between the first position 94 and the second position 112 for the piston 82. Distance 120 represents the difference between the first position 64 and the second position 114 for the guide 60. Both distance 118 and distance 120 can be at least one inch or more. In other words, the first position 64 for the guide 60 can be at least one inch away from the second position 114 of the guide 60. Moving the guide 60 from the first position 64 to the second position 114 (essentially sideways, i.e., laterally) moves the seatbelt webbing 62 sideways toward the vertical midline 44 as well and thus maintains an occupant 66 of the first seating assembly 20 of the vehicle 10 in proper orientation while the vehicle 10 is engaged in an oblique impact event or a far-side impact event. For example, a head 122 (see FIG. 3) of an occupant 66 sitting in the first seating assembly 20 of the vehicle 10 during an oblique impact event near side 16 or corner 110 (see FIG. 6) might travel between first side airbag 38a and first forward airbag 38c, if the guide 60 is in the first position 64. That is an improper orientation. By moving the guide 60 to the second position 114, the seatbelt webbing 62 keeps the occupant 66, and therefore the head 122 of the occupant 66, in a proper orientation during the oblique impact event, and the head 122 of the occupant 66 will encounter the first forward airbag 38c as intended. Because the second seating assembly 22 can be structured as a mirror image of but otherwise identical to the first seating assembly 20, only the first seating assembly 20 is particularly discussed herein. However, it should be understood that the second seating assembly 22 can likewise include a guide that is movable to a second position from a first position to keep an occupant properly oriented during an oblique impact event occurring closer to the second side 18 or a far-side impact event relative to the second seating assembly 22.

Figure 11:
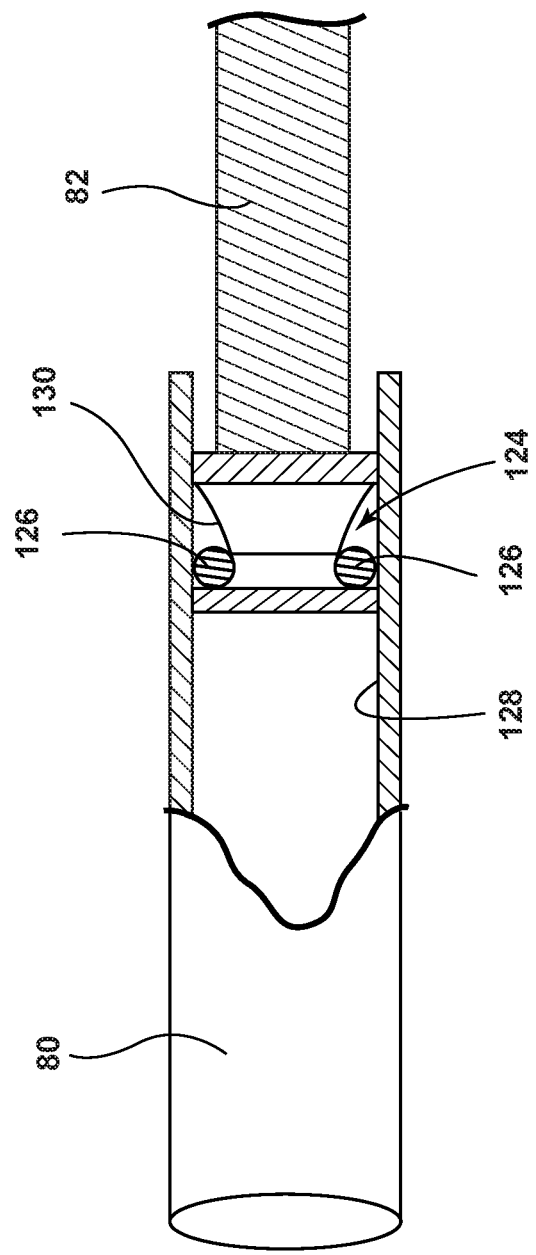
FIG. 11 is a magnified view of area XI from FIG. 9, particularly the actuator of FIG. 4, illustrating, in a cutaway view, a non-return mechanism of balls working against an inner cylinder surface and a tapered profile portion of the piston to prevent the piston from moving back toward the first position from the second position.

Referring now to FIG. 11, the actuator 80 (which, again, can be a pyrotechnic actuator) further includes a non-return mechanism 124. The non-return mechanism 124 prevents the piston 82 from returning to or toward the first position 94 (as in FIG. 5) from the second position 112 (as in FIG. 9), after the piston 82 is moved to the second position 112. In this embodiment, the non-return mechanism 124 includes balls 126 that cooperate with an inner cylinder surface 128 of the actuator 80 and a tapered profile portion 130 of the piston 82. The balls 126 follow the piston 82 as the piston 82 is moved to the second position 112. However, the tapered profile portion 130 of the piston 82 causes the balls 126 to push against the inner cylinder surface 128 of the actuator 80, if a force is applied to the piston 82 to push the piston 82 back toward the first position 94, thus preventing the piston 82 from returning to the first position 94 after moving to the second position 112.

Figure 12:
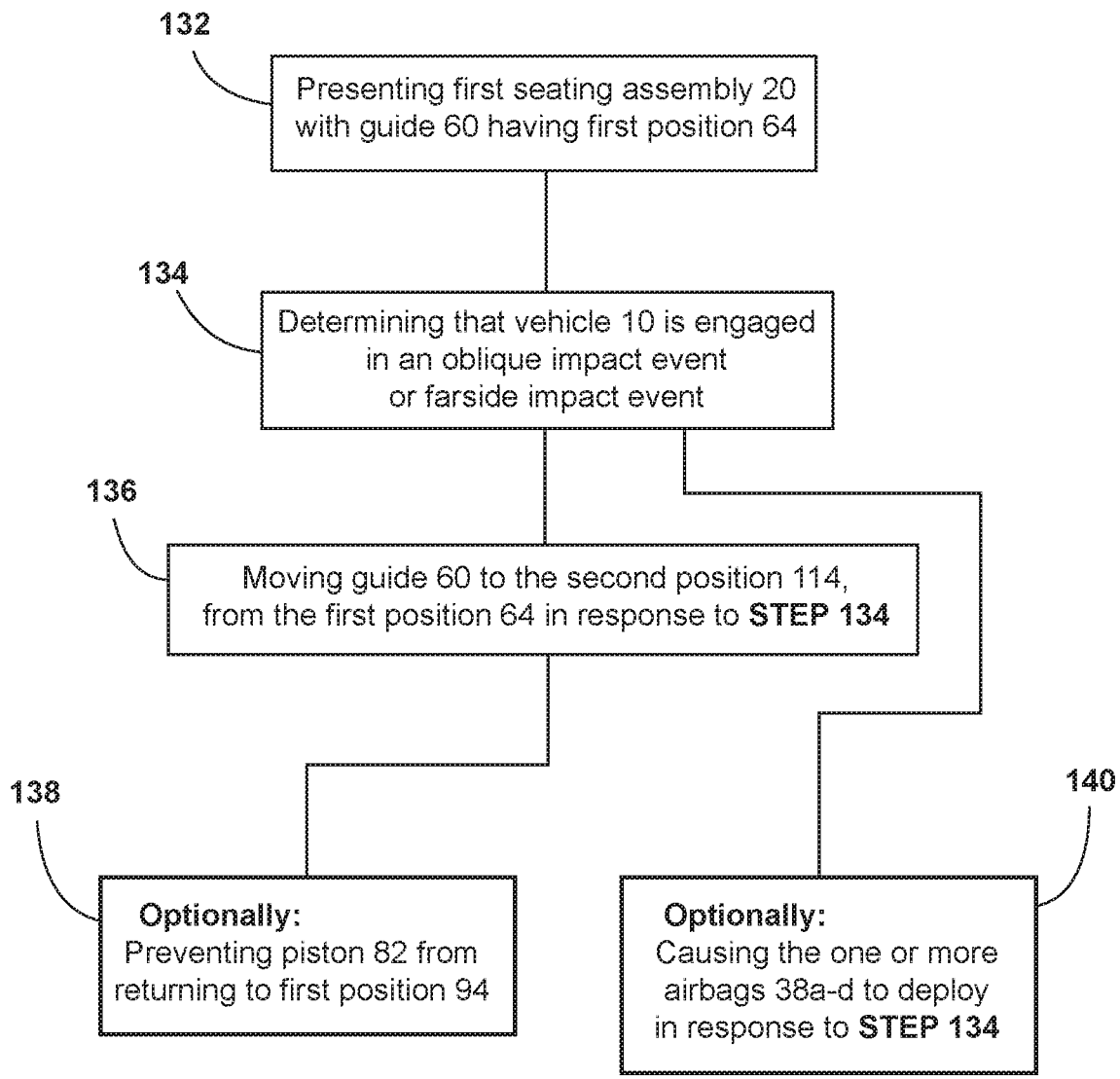
FIG. 12 is a diagram illustrating a novel method of maintaining proper orientation of the occupant in the first seating assembly of the vehicle of FIG. 1 while the vehicle is engaged in the oblique impact event of FIG. 6 or the far-side impact event of FIG. 7.

Referring now to FIG. 12, a novel method of maintaining proper orientation of the occupant 66 in the first seating assembly 20 of the vehicle 10 while the vehicle 10 is engaged in an oblique impact event or a far-side impact event is described herein. The method, at step 132, includes presenting the first seating assembly 20 described above, with the seatback 42, and the seatback 42 includes the vertical midline 44 and the guide 60 for the seatbelt webbing 62 having a first position 64 relative to the vertical midline 44. The method, at step 134, further includes determining that the vehicle 10 is engaged in an oblique impact event (as in FIG. 6) or a far-side impact event (as in FIG. 7). The controller 32 can make such a determination based on data received from the one or more oblique impact sensors 28 and/or the one or more side impact sensors 30, as mentioned above. The method, at step 136, further includes moving the guide 60 to the second position 114, from the first position 64, in response to the determined oblique impact event or far-side impact event (step 134). This step 136 can include the actuator 80 moving the piston 82 from the first position 94 to the second position 112, in response to the determined oblique impact event or the far-side impact event, which in turn causes the guide 60 to move from the first position 64 to the second position 114. Further, in this embodiment of the seatback 42, moving the guide 60 to the second position 114 in response to the oblique impact event or far-side impact event includes the connector 86 sliding along the track 96. Further, in this embodiment of the seatback 42, moving the guide 60 to the second position 114 in response to the oblique impact event or far-side impact event includes the pyrotechnic actuator 80 firing in response to the oblique impact event and causing the guide 60 to move to the second position 114 and the controller 32 causing the pyrotechnic actuator 80 to fire. The method, at step 138, can optionally further include preventing the piston 82 from moving from the second position 112 back toward the first position 94. As discussed above, the piston 82 can include a non-return mechanism 124 to perform this function, which may take the form of balls 126 working with the inner cylinder surface 128 of the actuator 80 and the tapered profile portion 130 of the piston 82, or some other form.

The method, at step 140, optionally further includes causing the one or more airbags 38a-d to deploy in response to the oblique impact event or the far-side impact event. The controller 32, which causes the actuator 80 to move the piston 82 to the second position 112 and thus the guide to the second position 114, can additionally (simultaneously or nearly simultaneously) cause the one or more airbags 38a-d to deploy. The controller 32, which can be a restraints control module, can cause the one or more airbags 38a-d to deploy based on the data received from the one or more oblique impact sensors 28 and/or one or more side impact sensors 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatback for a seating assembly of a vehicle comprising:
    a vertical midline;
    a frame;
    a guide for seatbelt webbing, the guide being operably coupled to the frame, and the guide having a first position and a second position that is closer to the vertical midline than the first position;
    an actuator attached to the frame, the actuator having a piston, the piston having a first position and a second position; and
    a connector disposed between the actuator and the frame, the connector operably connecting the piston to the guide, such that the piston moving from the first position to the second position moves the guide from the first position to the second position.

2. The seatback of claim 1 further comprising:
    trim at least partially covering the frame;
    wherein, the guide is disposed at least partially above the trim, and the piston is operably connected to the guide below the trim.

3. The seatback of claim 1 further comprising:
    a track attached to the frame, the track slidably supporting the connector.

4. The seatback of claim 1,
    the actuator is disposed closer to the vertical midline than the guide for seatbelt webbing.

5. The seatback of claim 1, wherein, the actuator is a pyrotechnic actuator.

6. The seatback of claim 3, wherein, the actuator is disposed closer to the vertical midline than the track, and the track is disposed closer to the vertical midline than the guide.

7. The seatback of claim 1 further comprising:
    a top portion;
    wherein, the connector is disposed near the top portion of the seatback.

8. The seatback of claim 1,
    wherein, the first position of the guide is at least one inch away from the second position of the guide.

9. The seatback of claim 5,
    the pyrotechnic actuator includes a non-return mechanism that prevents the piston from returning to the first position from the second position.

10. A method of maintaining proper orientation of an occupant in a seating assembly of a vehicle while the vehicle is engaged in an impact event comprising:
    determining that the vehicle is engaged in an impact event, the seating assembly of the vehicle having a seatback, the seatback comprising: (a) a vertical midline; (b) a frame; (c) a guide for seatbelt webbing, the guide being operably coupled to the frame, and the guide having a first position and a second position that is closer to the vertical midline than the first position; (d) an actuator attached to the frame, the actuator having a piston, the piston having a position and a second position; and (e) a connector disposed between the actuator and the frame, the connector operably connecting the piston to the guide, such that the piston moving from the first position to the second position moves the guide from the first position to the second position; and
    moving the guide to a second position, which is closer to the vertical midline than the first position, in response to the impact event.

11. The method of claim 10,
    the seatback further comprising trim at least partially covering the frame;
    wherein, the guide is disposed at least partially above the trim; and
    wherein, at the second position, a portion of the guide disposed above the trim is closer to the vertical midline than at the first position, and a portion of the guide disposed below the trim is closer to the vertical midline than at the first position.

12. The method of claim 11,
    the piston is operably connected to the guide below the trim;
    wherein, moving the guide to the second position in response to the impact event includes the actuator moving the piston from the first position to the second position, in response to the impact event, which in turn causes the guide to move from the first position to the second position.

13. The method of claim 10, the seatback further comprising a track attached to the frame, the track slidably supporting the connector;

wherein, moving the guide to the second position in response to the impact event includes the connector sliding along the track.

14. The method of claim 10, wherein, the actuator is a pyrotechnic actuator; and wherein, moving the guide to a second position in response to the impact event includes the pyrotechnic actuator firing in response to the impact event and causing the guide to move to the second position.

15. The method of claim 10, the vehicle further comprising one or more sensors, and a controller in communication with the one or more sensors and the actuator;

wherein, determining that the vehicle is engaged in an impact event includes one or more sensors providing data to a controller that determines, based on the data, that the vehicle is engaged in an impact event; and wherein, moving the guide to the second position to the second position comprises the controller causing the actuator to move the piston to the second position.

16. The method of claim 10, the actuator is disposed laterally between the vertical midline and the guide for seatbelt webbing.

17. The method of claim 15, the vehicle further including one or more airbags; and the controller is a restraints control module that additionally controls whether one or more airbags deploy; and the method further comprising: causing one or more airbags to deploy in response to the impact event.

18. The method of claim 10 further comprising:

preventing the piston from moving from the second position back toward the first position.

19. A seatback for a seating assembly of a vehicle comprising:

a vertical midline;

a frame;

a guide for seatbelt webbing, the guide being operably coupled to the frame, and the guide having a first position and a second position that is closer to the vertical midline than the first position;

an actuator attached to the frame, the actuator having a piston movable, in a direction away from the guide, from a first position to a second position, the piston being disposed closer to the vertical midline than the actuator and the guide; and a connector connecting the piston to the guide, such that the piston moving from the first position to the second position moves the guide from the first position to the second position.

20. The seatback of claim 19, the actuator is disposed closer to the vertical midline than the guide for seatbelt webbing, and the piston moves toward the vertical midline while moving from the first position to the second position.

* * * * *